United States Patent [19]

Trechsel

[11] Patent Number: 4,640,448

[45] Date of Patent: Feb. 3, 1987

[54] VOLUME ADJUSTMENT DEVICE FOR POWDER FILLING APPARATUS

[75] Inventor: Hans W. Trechsel, Rockford, Minn.

[73] Assignee: TL Systems Corporation, Minneapolis, Minn.

[21] Appl. No.: 747,567

[22] Filed: Jun. 24, 1985

[51] Int. Cl.[4] ............................................. G01F 11/24
[52] U.S. Cl. .................................... 222/636; 222/306; 222/308; 222/368
[58] Field of Search ................................ 222/306–308, 222/636, 368, 438, 216, 295, 297, 305, 304, 440; 221/266

[56] References Cited

U.S. PATENT DOCUMENTS

| 3,090,524 | 5/1963 | Corcoran | 222/306 |
| 3,306,323 | 2/1967 | Aronson | 141/72 |
| 3,446,404 | 5/1969 | Mehta | 222/306 |
| 3,471,061 | 10/1969 | Aronson | 222/141 |
| 3,527,015 | 9/1970 | Aronson et al. | 53/37 |
| 3,601,954 | 8/1971 | Aronson | 53/282 |
| 3,656,517 | 4/1972 | Taylor et al. | 141/1 |
| 3,874,431 | 4/1975 | Aronson | 141/129 |
| 4,371,101 | 2/1983 | Cane et al. | 222/636 |

FOREIGN PATENT DOCUMENTS

| 897644 | 4/1972 | Canada | 222/306 |
| 553387 | 2/1923 | France | 222/306 |

Primary Examiner—Charles A. Marmer
Assistant Examiner—Nils Pedersen
Attorney, Agent, or Firm—Merchant, Gould, Smith, Edell, Welter & Schmidt

[57] ABSTRACT

Apparatus is disclosed for dispensing materials into containers in precise amounts, which includes an adjustment mechanism for precisely controlling the volume of material dispensed. The dispensing apparatus comprises a dispensing wheel having a plurality of dispensing chambers arranged in a radial manner on the wheel. Each chamber includes a mechanism for varying its volume and hence the quantity of the substance received and discharged. The adjustment mechanism includes an externally accessible toothed wheel which is rotatable in one direction to increase the volume of the chamber and is rotatable in the opposite direction to decrease the chamber volume. First and second actuators are disposed relative to the dispensing wheel and are selectively operated to engage the toothed wheel on opposite sides of its rotational axis. This engagement takes place while the dispensing wheel is revolving, and engagement of either of the actuator means causes the toothed adjustment wheel to rotate in the selected direction to increase or decrease the chamber volume. In an alternative embodiment, the externally accessible adjustment wheel is a gear member, and the actuator means comprises a gear member connected to a reversible motor that is employed while the dispensing wheel is at rest. With either embodiment, the volume of each chamber can be precisely controlled quickly and automatically.

22 Claims, 12 Drawing Figures

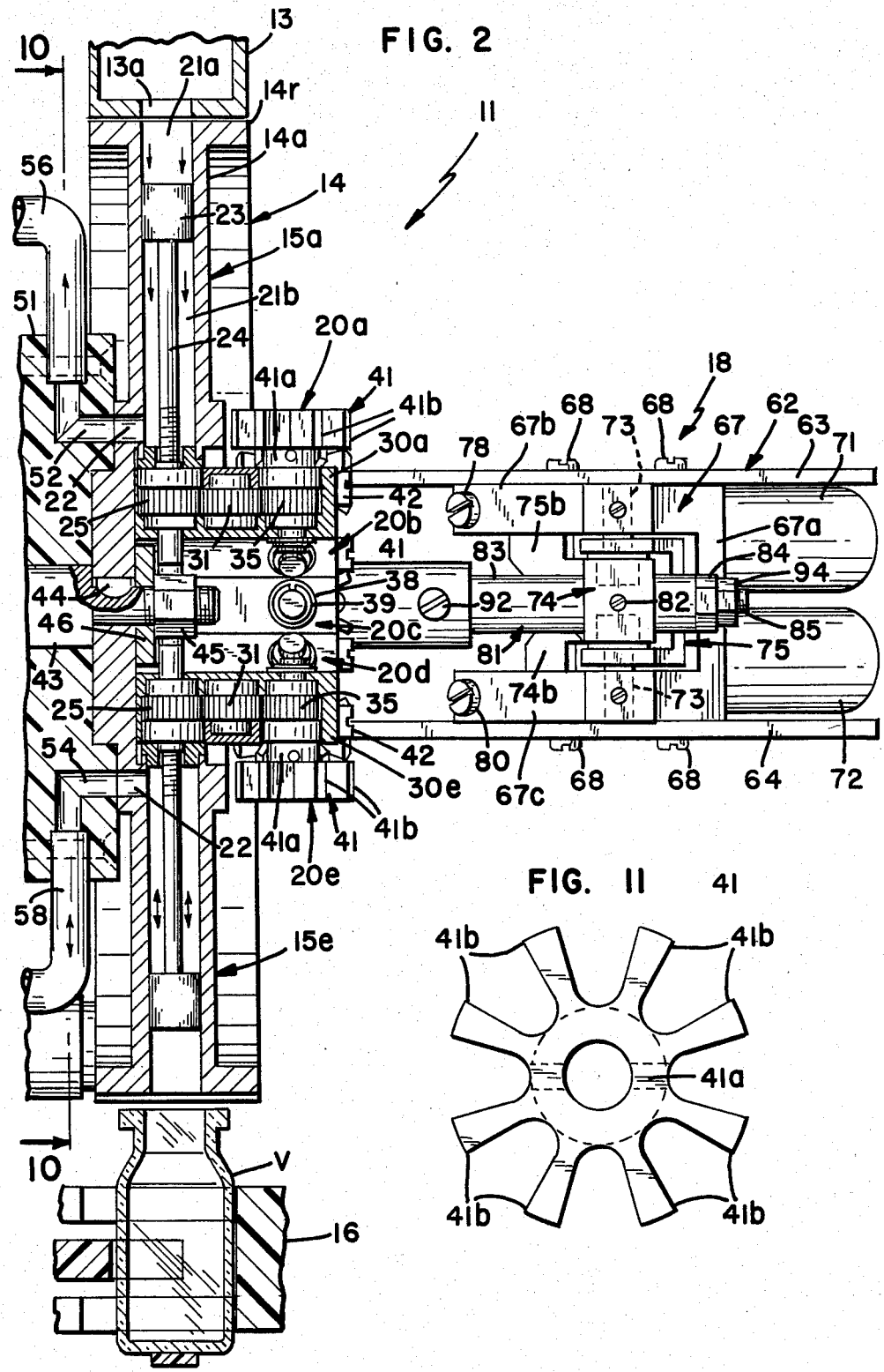

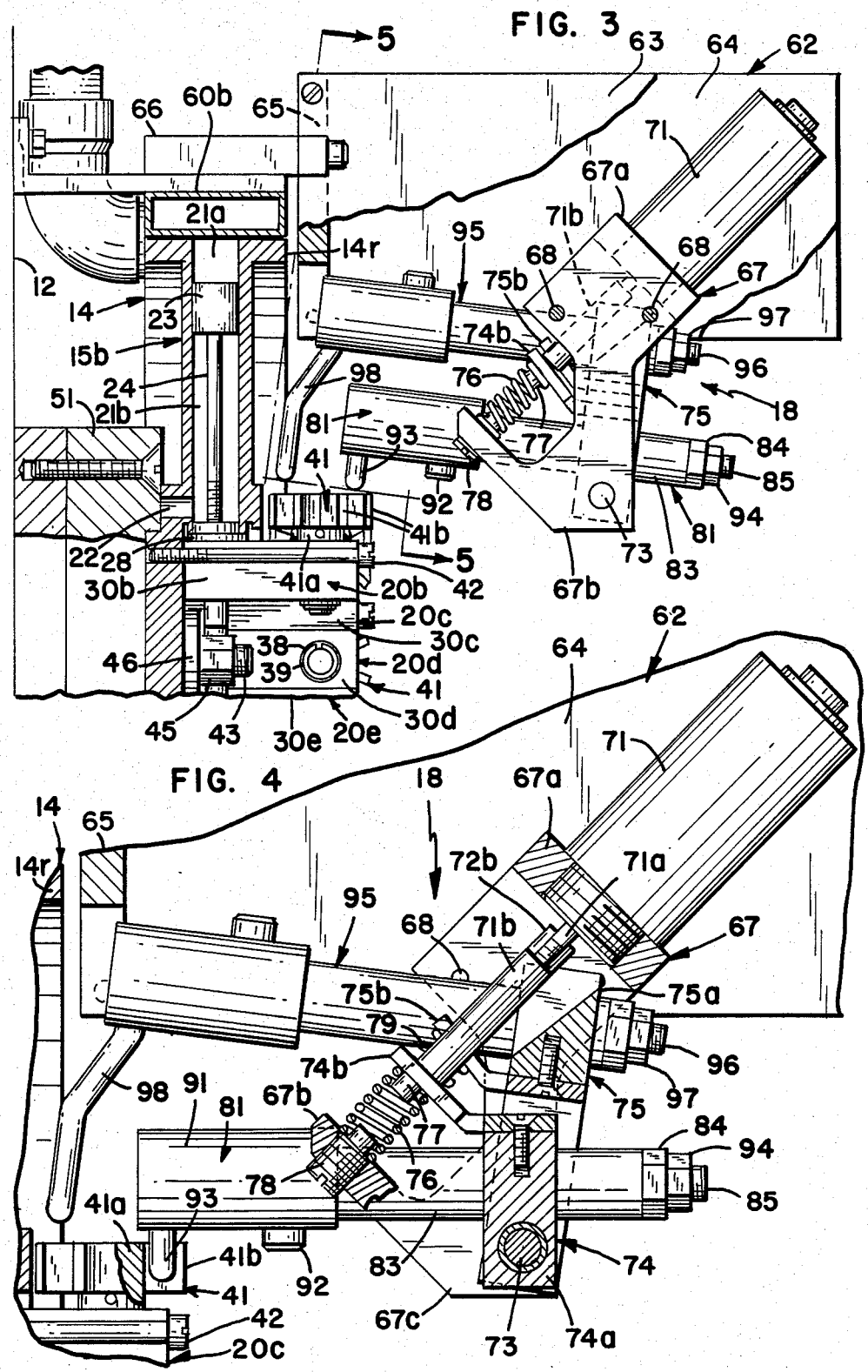

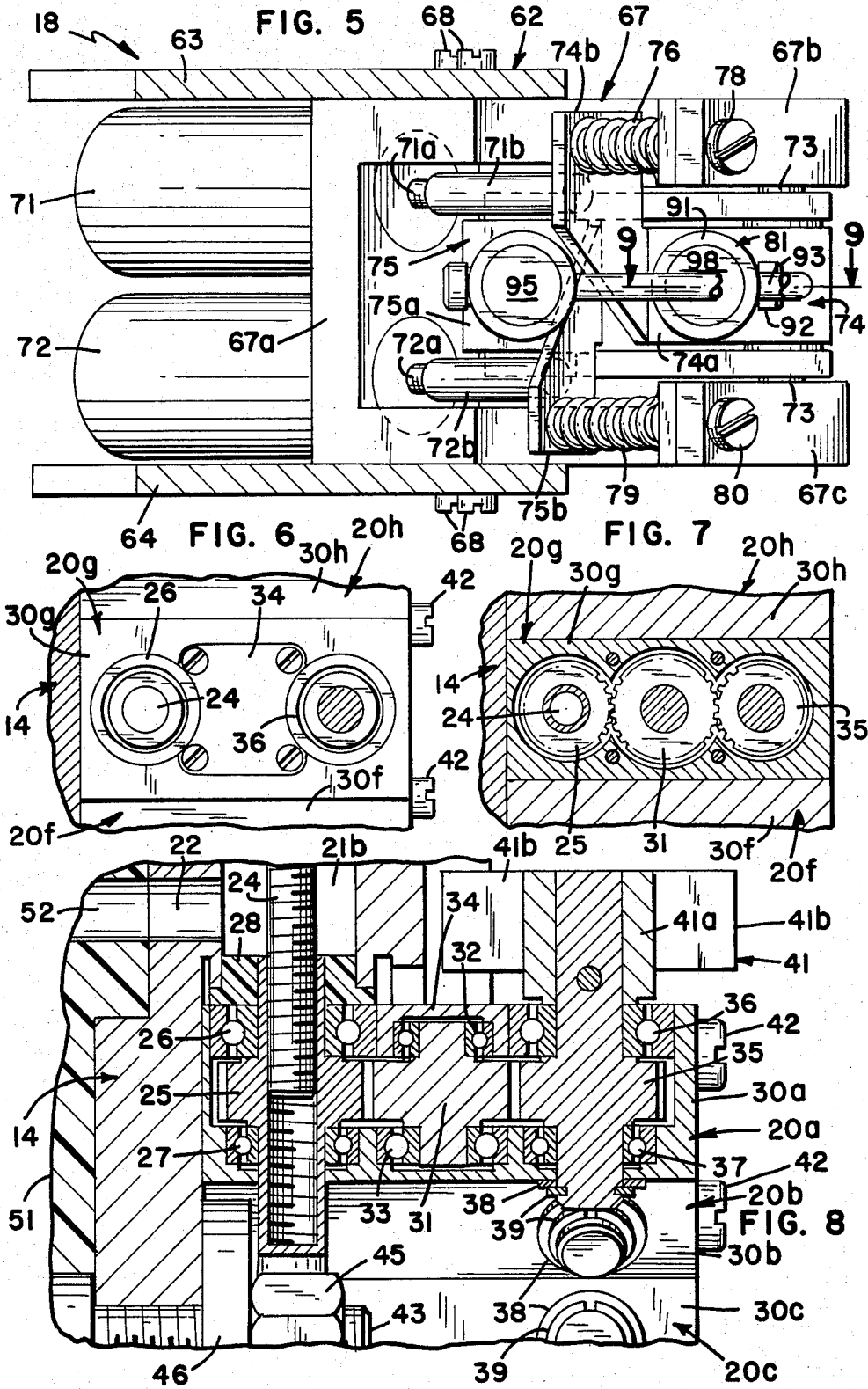

VOLUME ADJUSTMENT DEVICE FOR POWDER FILLING APPARATUS

The invention broadly relates to apparatus for dispensing materials into containers in precise amounts, and is specifically directed to an adjustment mechanism for precisely controlling the volume of material dispensed.

The dispensing of drugs and other pharmaceutical preparations in powder form into vials and similar containers must be with considerable accuracy, particularly to insure accuracy in filling medicinal prescriptions.

A number of different types of powder-filling devices are commercially available. A particularly useful apparatus is the Model E/H-1200 Automatic Sterile Powder Filler of Perry Industries, Inc., Hixville, N.Y. This machine utilizes a dispensing wheel that rotates on a horizontal axis and includes a plurality of dispensing chambers disposed radially in a spoke-like fashion on the wheel. Each chamber opens at the wheel rim, permitting it to receive a charge of sterile powder from a hopper disposed over the wheel. A vacuum is momentarily applied to hold the charge of powder in the chamber until the chamber reaches a diametrically opposite position over one of a series of pharmaceutical vials that are moved sequentially in timed relation to the dispensing wheel. In this discharge position, pressure is momentarily applied to the chamber to dispense the charge of powder into the vial.

The volume of the chamber is defined by a porous piston through which air under either a vacuum or pressure may pass. The axial position of the piston within the chamber is manually adjustable to vary the volume of the chamber, and hence the amount of powder received and dispensed.

Although the chamber volume may be adjusted, it is a relatively difficult procedure and requires stoppage of the machine. Further, adjustments must be on a trial and error basis, and each adjustment requires downtime until the proper volume is obtained. Further, the sterile powder itself may vary during the course of operation (e.g., by moisture content), and it is very difficult to monitor and keep up with such changes to insure continuing accuracy in the volume or weight of vial contents.

SUMMARY OF THE INVENTION

The subject invention is the result of an endeavor to provide continuous adjustment to each of the several powder dispensing chambers of apparatus of this type. In the preferred embodiment, the porous piston for each dispensing mechanism is carried on a threaded rod within the chamber, and the rod is inserted in a threaded central bore of a rotating gear. Rotation of the gear in a first direction extends the threaded rod within the dispensing chamber, and hence moves the piston radially outward, and rotation in the opposite direction causes the rod to retract and with it the piston.

The gear which operates with the threaded rod is itself actuated through a series of gears terminating in a gear wheel which is disposed externally on the hub of the dispensing wheel. One gear wheel is provided for each dispensing mechanism, and rotation of any gear wheel in a forward or reverse direction will either increase or decrease the volume of the associated dispensing mechanism chamber.

A control apparatus for rotating a selected gear wheel in a desired direction is disposed adjacent the dispensing wheel for selective operation with any of the gear wheels as they pass by. The control apparatus in the preferred embodiment comprises selectively operated solenoids each of which controls a lever having a tripping pin. Actuation of one of the solenoids causes its associated tripping pin to move into engagement with the adjacent gear wheel on one side of its axis of rotation. The other lever may be operated to drop its tripping pin into engagement with the gear wheel on the opposite side of the gear rotational axis.

When either of the levers is so actuated, further movement of the dispensing wheel will cause the gear wheel to rotate until it moves out of engagement with the tripping pin. The direction of rotation of the gear wheel, which determines whether the chamber volume will be increased or decreased, depends on which of the tripping levers is actuated.

The amount of piston movement is determined by the gear reduction of the sequence of gears as well as the amount of rotation of the gear wheel when one of the tripping levers is actuated. In the preferred embodiment, the adjustment results in a small incremental movement of the associated piston, and hence a minimal change in the volume of the dispensing chamber. If further adjustments are necessary, the same gear wheel may be engaged by the proper tripping lever when it reaches a point opposite the control apparatus during the next cycle.

The inventive adjustment mechanism may be actuated manually, but it is preferable that it be automatically operated as the result of downstream sampling of pharmaceutical vials that have already been filled. Such sampling involves weighing apparatus which compares the weight of a filled vial with a reference weight, provides an electronic signal corresponding to the difference, and actuates the control apparatus to increase or decrease the amount of powder dispensed as is necessary.

BRIEF DESCRIPTION OF THE DRAWINGS

FIG. 2 is an enlarged fragmentary sectional view taken along the line 2—2 of FIG. 1, showing also a pharmaceutical vial to be filed with sterile powder;

FIG. 3 is an enlarged fragmentary sectional view taken generally along the irregular line 3—3 of FIG. 1, portions thereof being slightly out of position and portions broken away for purposes of illustration;

FIG. 4 is a further enlarged fragmentary sectional view taken along the line 4—4 of FIG. 1;

FIG. 5 is a further enlarged sectional view of an adjustment actuator mechanism taken along the line 5—5 of FIG. 3;

FIG. 6 is a further enlarged fragmentary sectional view taken along the line 6—6 of FIG. 1;

FIG. 7 is a further enlarged fragmentary sectional view taken along the line 7—7 of FIG. 1;

FIG. 8 is a further enlarged fragmentary sectional view similar to FIG. 2, showing in particular the mechanism for adjusting the volume powder to be dispensed;

FIG. 11 is a view in top plan of an adjustment wheel for the adjustment mechanism.

DESCRIPTION OF THE PREFERRED EMBODIMENT

Figure 1:
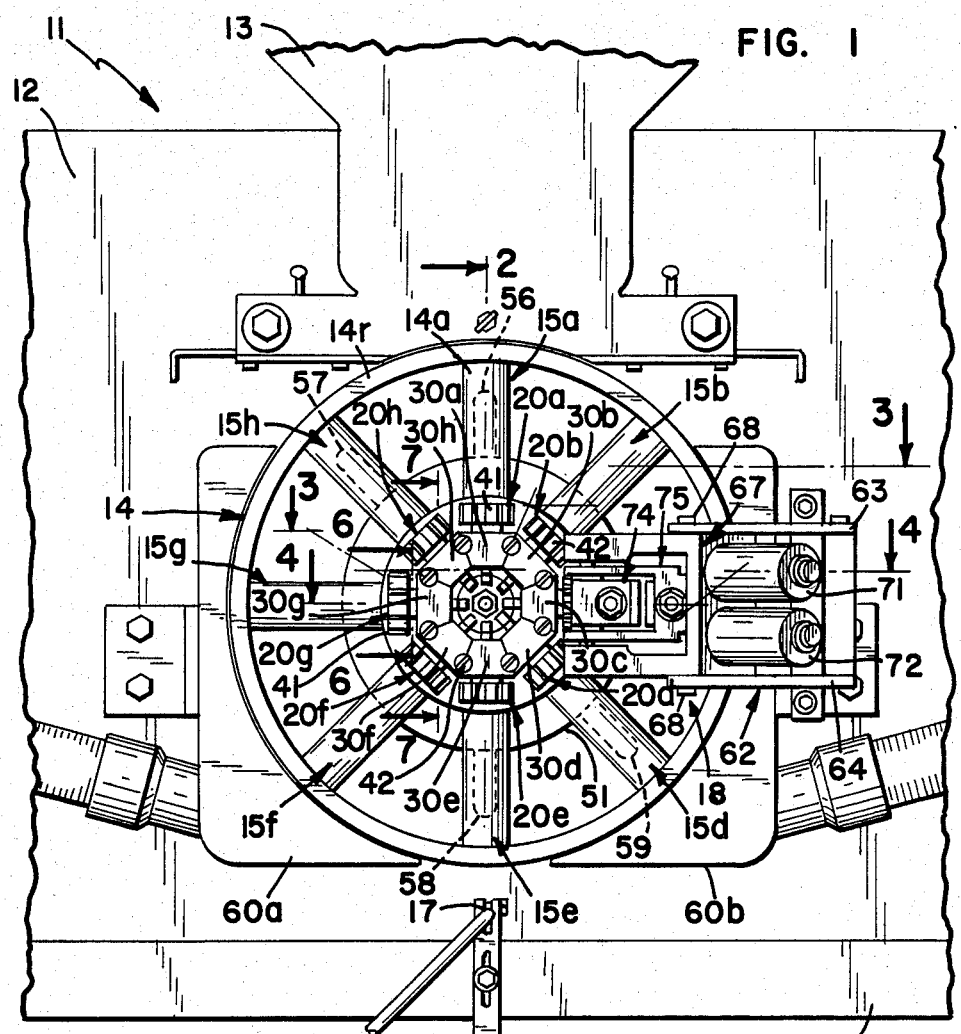
FIG. 1 is a fragmentary view in front elevation of a machine for filling sterile powder into pharmaceutical and similar-type vials, including an inventive adjustment mechanism for varying the amount of powder dispensed.

With initial reference to FIG. 1, a machine for dispensing sterile powder into pharmaceutical vials or the like is represented generally by the numeral 11. Machine 11 comprises a frame 12 to which a hopper 13 is mounted in overlying relation to a dispensing wheel 14. The hopper 13 contains sterile powder which is discharged in discrete amounts to the dispensing wheel 14 in a manner described below. The dispensing wheel 14 moves in a counterclockwise direction as viewed in FIG. 1, and includes a plurality of dispensing devices 15a-h which are arranged radially relative to the wheel axis of rotation. Each of the dispensing devices 15a-h receives a precise amount of powder from the hopper 13 as it moves through a vertical position beneath the hopper outlet (see dispensing device 15a), and discharges the volume of powder when it reaches the diametrically opposite downward vertical position (see dispensing device 15e). In this vertical downward position, each of the dispensing devices 15a-h discharges powder into a pharmaceutical vial V (not shown in FIG. 1, but see FIG. 2) that moves from left to right along a conveyor track 16. A sensor 17 is positioned adjacent the conveyor track 16 in the powder discharge position to determine the presence of a pharmaceutical vial V, and to abort the discharging function if no vial V is present.

Adjustment mechanisms 20a-h are provided for the respective dispensing devices 15a-h for increasing or decreasing the amount of sterile powder to be discharged, and an actuator represented generally by the numeral 18 is constructed and operated in a manner described in detail below to selectively adjust each device 15a-h as is necessary. Although the actuator 18 may be manually operated, it is preferably automatically operated by a servo-control system (not shown) including means for precisely weighing each filled pharmaceutical vial and providing an error signal to electronic control circuitry for controlling the actuator 18 accordingly.

The dispensing devices 15a, e are shown in detail in FIG. 2. Each of the devices 15a-h is virtually identical, and a detailed description of mechanism 15a will be exemplary of all.

The dispensing wheel 14 itself defines a "spoke" 14a for the mechanism 15a in which a cylindrical chamber is formed. A piston 23 is disposed in this chamber, defining an outer or dispensing chamber 21a and an inner chamber 21b. The dispensing chamber 21a is of constant diameter and opens through the rim 14r of wheel 14 for registration with a discharge outlet 13a of identical size in the hopper 13. It will be appreciated that registration of the dispensing chamber 21a and discharge outlet 13a occurs only when the mechanism 15a is in the position shown in FIG. 1.

An inlet 22 is formed in the spoke 14a at the base of the chamber 21b and near the hub of the dispensing wheel 14 for alternately exposing the chamber 21b to vacuum and pressure as described in further detail below.

Piston 23 is formed from a material which is sufficiently porous to permit the passage of air therethrough in either direction, but which will not permit the passage of sterile powder.

Piston 23 is secured to a rod 24 the lower end of which is threaded. The piston 23 and rod 24 do not move axially during the powder filling operation, but may be adjustably moved to vary the axial position of the piston 23, and as a consequence to vary the volume of chamber 21a between the top of the piston 23 and the opening of chamber 21a at the surface of wheel rim 14r.

With reference to FIGS. 1, 2 and 3, each of the adjustment mechanisms 20a-h comprises a housing (see reference numerals 30a-h, respectively), the cross sectional form of which is a truncated triangle, permitting the housing to be assembled into a hub for the dispensing wheel 14 (see FIGS. 1 and 2).

The housings 30a-h are identical in structure and FIGS. 6-8 of housings 30a and 30g are exemplary.

With continued reference to FIG. 8, the threaded portion of rod 24 is received within the threaded bore of a first gear member 25. First gear member 25 is freely rotatable in the housing 30a between ball bearings 26, 27. Bearing 27 is retained in a recess in the base of housing 30a. A gasket 28 is compressed between the upper surface of bearing 26 and a step formed in the top of housing 30a.

A second gear member 31 is rotatably carried in the housing 30a between a pair of ball bearings 32, 33 in intermeshing engagement with the first gear member 25. Ball bearing 33 is retained in a recess in housing 30a, and bearing 32 is held in place by a retainer 34 which is disposed adjacent the ball bearing 26.

A third gear member 35 is rotatably mounted in the housing 30a between ball bearings 36, 37 in intermeshing relationship with the second gear member 31. Third gear member 35 is integrally formed on a stub shaft that projects both above and below the ball bearings 36, 37. The lower end projects through the housing 30a and is locked in place by a washer 38 and split ring retainer 39. The upper end projects radially beyond the housing 30a and carries a gear wheel 41.

FIG. 6 is a top plan view of the housing 30g for adjustment mechanism 15g with housings 30f and 30h in adjacent relation. FIG. 6 also discloses the retainer 34 which is screwed into the housing 30g to retain the ball bearings 32, 33 and second gear member 31. As also shown in FIG. 1, a plurality of screws 42 pass through the entire length of the housings 30a-h at the joints thereof and into the wheel member 14 to secure all of the adjustment mechanisms 30a-h in place.

FIG. 7 is a sectional view through the housing 30g showing the intermeshing relationship of the gear members 25, 31 and 35.

With reference to FIG. 11, the gear wheel 41 includes a hub 41a with a plurality of teeth 41b that are spaced apart a sufficient amount to permit the interpositioning of either of two tripping levers (described below) which selectively effect rotation of the gear wheel 41 in either direction. Movement of the gear wheel 41 in one rotational direction acts through the gear members 35, 31 and 45 to extend the rod 24 and piston 23 to reduce the size of the discharge chamber 21a, and rotation of the gear wheel 41 in the opposite direction causes the rod 24 and piston 23 to retract, thus increasing the size of the chamber 21a.

As will become apparent below, the gear wheel 41 is rotated only the angular distance subtended between two of the teeth 41b (45 degrees in the preferred embodiment), and the resulting movement of piston 23 as a result is minimal and precise.

With reference to FIG. 2, the machine 11 includes a rotatable shaft 43, the extreme end of which is stepped down and threaded. The wheel member 14 is secured to the stepped down portion of the shaft by a key 44, and a nut 45 and washer 46 lock the wheel member 14 in place.

Figure 10:
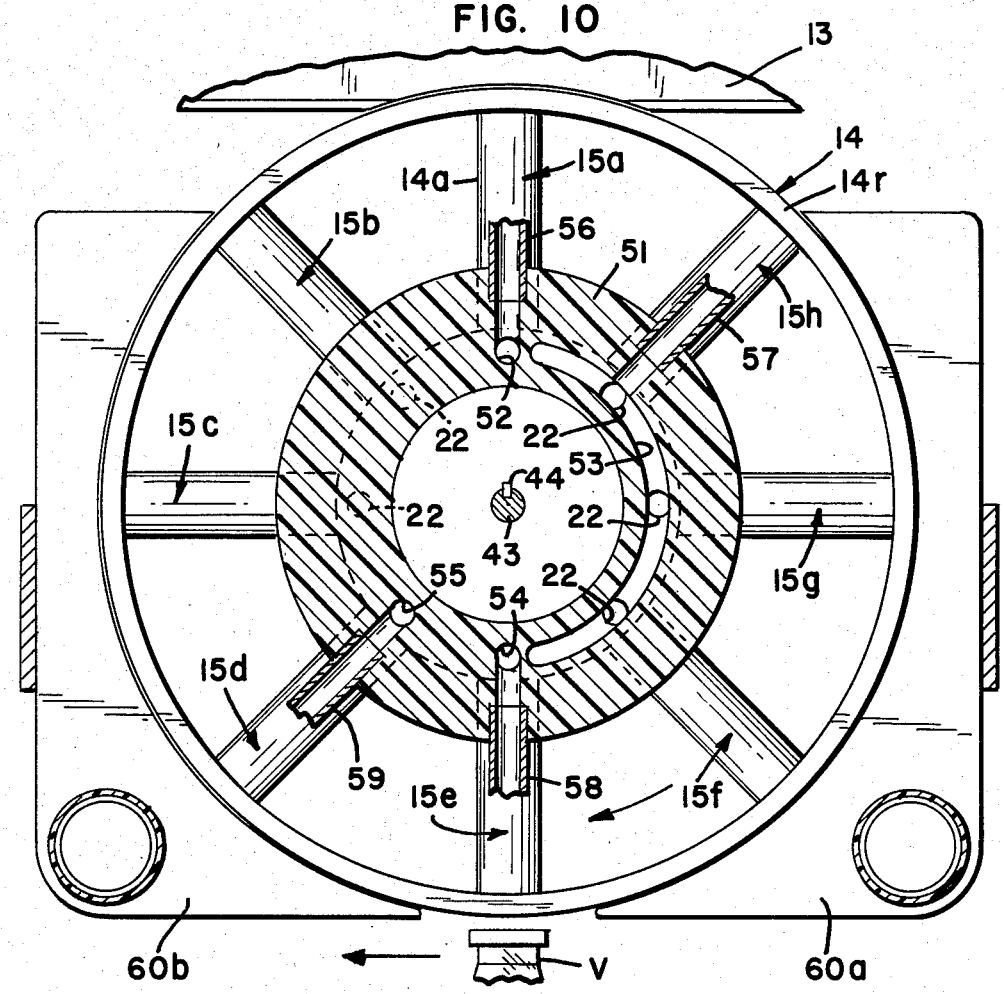
FIG. 10 is a reduced fragmentary sectional view taken along the line 10—10 of FIG. 2.

With reference to FIGS. 2 and 10, a stationary, annular manifold plate 51 is concentrically disposed adjacent the wheel member 14 in rotatable sliding engagement therewith. A transverse bore 52 is disposed in the manifold plate 51 in a position where the inlet 22 of each of the dispensing mechanisms 15 will pass in registration. Immediately adjacent the bore 52 is an arcuate passage 53 disposed at the same radial distance as bore 52, and thus in communication with a plurality of the inlets 22 of dispensing mechanisms 15a–h. Diametrically opposite the bore 52 is a transverse bore 54, which is disposed the same radial distance from the wheel center as bore 52 and passage 53. A third transverse bore 55 is disposed adjacent the bore 54 and spaced an arcuate distance corresponding to that between the dispensing mechanisms 15.

With additional reference to FIG. 2, a first conduit 56 is secured to the manifold plate 51 and communicates with the bore 52 through a connecting passage. A second conduit 57 communicates with the arcuate passage 53 in a similar manner. Similar conduits 58, 59 are connected to the manifold plate 51 in a similar manner and communicate with the bores 54, 55 respectively. Conduits 56 and 57 are connected to a source of vacuum, and conduits 58, 59 are connected to a source of air under pressure. As such, when the discharge chamber 21a of each of the dispensing devices 15a–h is rotated to the uppermost point of the wheel (dispensing device 15a in FIGS. 2 and 10), the chamber 21b below the piston 23 is in communication with the vacuum source 56 through inlet 22, and since the piston 23 is porous, a partial vacuum is created in the chamber 21a above piston 23.

At the same time, the mouth of chamber 21a registers with the discharge outlet 13a of hopper 13, and draws powder into the upper chamber 21a in a precise amount determined by the position of piston 23.

As dispensing wheel 14 rotates (clockwise as viewed in FIG. 10), the inlet 22 of the dispensing device 15h, which has just received a charge of powder, begins its communication with the arcuate passage 53. As long as this communication exists, vacuum applied through the conduit 57, arcuate passage 53, inlet 22, chamber 21b and piston 23 will keep the entire charge of powder in upper chamber 21a.

With continued rotation of the dispensing wheel 14, the inlet 22 of the charged dispensing device 15 leaves the arcuate passage 53 and moves into registration with bore 54 (see device 15e in FIG. 10). Since bore 54 is supplied with air under pressure through conduit 58, the charge of powder is forced from the chamber 21a into a pharmaceutical vial V, which has been brought to the position shown in FIGS. 2 and 10 by the conveyor 16 in timed relation to the arrival of the dispensing mechanism 15e. As such, the entire charge of powder is forced out of the upper chamber 21a into the vial V.

As the dispensing wheel 14 continues its rotational movement, the inlet 22 of dispensing device 15d moves into registration with bore 55, thus placing its upper chamber 21a under pressure again through communication with the conduit 59. This insures that residual powder in the chamber 21a is fully discharged. Arcuately shaped vacuum manifolds 60a, 60b on each side of the dispensing wheel 14 collect residual powder and return it to a collection container.

When each dispensing device 15a–h reaches the uppermost point on the dispensing wheel 14 again, the cycle repeats.

With reference to FIGS. 1–5, apparatus for controlling the position of each of the gear wheels 41, and hence the volume of each of the dispensing mechanisms 15a–h is represented generally by the numeral 62. Control apparatus 62 includes a housing formed from upper and lower plates 63, 64 commonly mounted to an endplate 65 which is in turn bolted to a mounting plate 66 on the frame 12.

An irregularly shaped solenoid housing block represented generally by the numeral 67 has a width corresponding to the distance between side plates 63, 64, and is secured therebetween by screws 68 (FIG. 2). As best shown in FIGS. 3 and 4, the solenoid housing block 67 projects well beyond the edges of plates 63, 64.

Housing block 67 includes a relatively thick spanning member 67a formed with large threaded apertures to receive the threaded shank of each of two solenoids 71, 72 (FIG. 5). The solenoids 71, 72 have threaded rods 71a, 72a, respectively upon which plungers 71b, 72b are respectively screwed. The axial position of the plungers 71b 72b is adjustable on the associated rod to determine the throw or extension of the associated solenoid in operation, as will become apparent below.

With reference to FIG. 5, the solenoid housing block 67 has integrally formed sides 67b, 67c which are parallel and spaced apart. A pivot pin 73 (see also FIGS. 3 and 4) is carried between the sides 67b, 67c and carries a pair of pivot levers 74, 75. As best shown in FIGS. 4 and 5, the lever 74 comprises an irregularly shaped block 74a to which a lever plate 74b is screwed. Lever plate 74b is formed at an obtuse angle to be in perpendicular relation to the plunger 71b, and it is configured and disposed to abutably receive the plunger 71b.

With continued reference to FIGS. 4 and 5, a coil spring 76 is compressibly disposed between the lever plate 74b and the aligned, projecting arm of block side 67b. The spring 76 is retained between a small stud 77 affixed to the underside of the lever plate 74b, and an adjustable stud 78 that is threaded into the block side 67b. As such, the spring 76 normally biases the lever plate 74b, and hence the solenoid plunger 71b into the position shown in FIG. 3, which corresponds to the retracted position of solenoid 71. Upon actuation of the solenoid 71, the plunger 71b is extended, causing the lever 74b to rotate in a counterclockwise direction against the bias of compression spring 76. This position is shown in FIG. 4.

Lever 75 includes a lever block 75a which is longer than the lever block 74a as best shown in FIG. 4. A lever plate 75b is secured to the block 75a in perpendicular, abutable relation to the plunger 72b (FIG. 5), and a coil spring 79 disposed between the lever plate 75b and block side 67c normally urges the lever plate 75b into the retracted position of solenoid 72. An adjustable stud 80 is threadably carried by the block side 67c to adjust the compressibility of spring 79.

Figure 9:
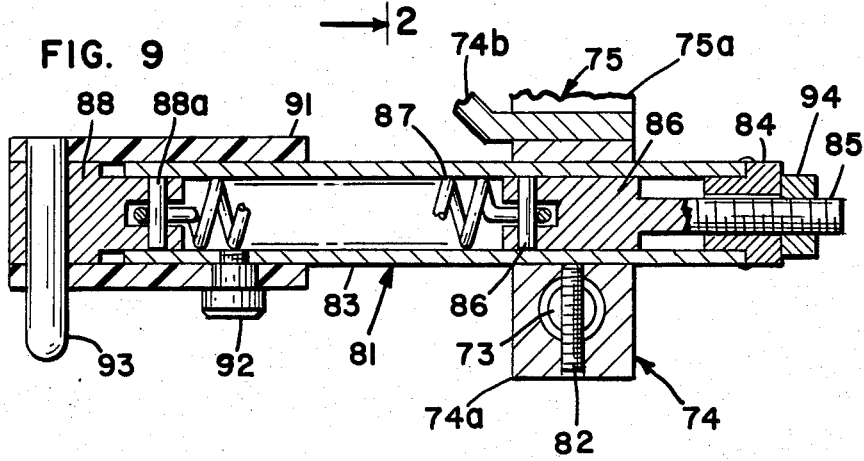
FIG. 9 is a further enlarged fragmentary sectional view taken along the line 9—9 of FIG. 5.

With reference to FIGS. 4 and 9, the lever block 74a is formed with a large aperture to receive a trip housing 81. A set screw 82 holds the trip housing 81 in a predetermined axial position relative to the lever block 74a.

Trip housing 81 comprises a cylindrical tube 83 one end of which is closed by a cylindrical plug 84 having a threaded bore that receives a threaded adjustment stud 85. The adjustment stud 85 is integrally connected to an internal spring tensioner 86 that slides axially within the tube 83 when an external adjustment nut mounted on the screw 85 is adjusted. Spring tensioner 86 has a transverse retaining pin 86a that receives and retains one end of a coil spring 87.

The opposite end of the spring 87 is held by the retaining pin 88a of a spring tensioner 88 that also serves as an end plug for the opposite end of the cylindrical tube 83. Spring tensioner 88 is capable of axially sliding within the tube 83 to a limited degree as discussed below.

An external torque tube 91 has an inside diameter corresponding to the outside diameter of the cylindrical tube 83 and spring tensioner 88, and is held in a fixed position relative to the tube 83 by a screw 92. A short trip pin 93 passes through transverse aligned openings within the torque tube 91 and spring tensioner 88, projecting below the trip housing 81.

Because the spring tensioner 88 is capable of axial sliding movement relative to the stationery torque tube 91, the tension within coil spring 87 draws the tensioner 88 axially inward and imparts a shear force on the tripping pin 93 relative to the torque tube 91. This retains the trip pin 93 in a fixed position by a variable force determined by adjustment of the nut 94.

With reference to FIGS. 3 and 4, a virtually identical trip housing 95 having a threaded adjustment stud 96 and adjustment nut 97 is carried by the lever 75. An elongated trip pin 98 is retained in the same manner as trip pin 93, although it is somewhat longer and is bent into a stepped configuration to be in proper indexing alignment relative to the gear wheel 41.

As particularly shown in FIGS. 3-5, although the solenoids 71, 72 are disposed in vertical side-by-side relation, the trip housings 81, 95 are disposed in horizontal side-by-side relation. This relationship, coupled with the offset shape and pivotal movement of the levers 74, 75, respectively, permits the trip pins 93, 98 to be selectively moved into and out of engagement with the gear wheel 41 which is disposed in a position for adjustment at a particular point in time (see FIG. 1).

Because of the structural configuration and positioning of the trip housings 81, 95, the trip pin 93 is capable of insertion between gear teeth 41b on one side of the rotational axis of the gear wheel 41, whereas the trip pin 98 is capable of insertion between gear teeth 41b on the opposite side of the rotational axis of gear wheel 41. Depending on which of the pins 93, 98 is inserted into the gear wheel 41, the gear wheel 41 will be moved incrementally in either a clockwise or counterclockwise direction as the dispensing wheel 14 intermittently rotates through the various dispensing positions. As such, selected operation of one of the solenoids 71, 72 when a particular gear wheel 41 is disposed opposite the control apparatus 62 will, upon further rotation of the dispensing wheel 14, cause the gear wheel 41 to be rotated in either direction, and will thus incrementally increase or decrease the volume of the upper powder dispensing chamber 21.

More specifically, the dispensing wheel 14 is rotated intermittently in 45° increments. When the dispensing wheel 14 is momentarily at rest, the uppermost dispensing mechanism 15 is in registration with the hopper 13 to receive a charge of powder, and the lowermost dispensing mechanism 15 is in a position to dispense its charge into the pharmaceutical vial V. At the same time, one of the gear wheels 41 is disposed opposite the control apparatus 62 in a position where it may be adjusted if necessary. If, for example, the associated dispensing chamber 21 needs to be enlarged, solenoid 71 is actuated, causing the lever 74 to pivot in a counterclockwise direction, in turn causing the trip pin 93 to drop into the gear wheel 41 as shown in FIG. 4. Because the dispensing wheel 14 moves in a counterclockwise direction as viewed in FIG. 1, the gear wheel 41 will move in a direction that, through concomitant movement of the gears 35, 31 and 25, will cause the threaded rod 24 to move axially downward as viewed in FIG. 8. The associated piston 23 would also move downward or away from the rim 14r, thus enlarging the size of the dispensing chamber 21a.

Actuation of the solenoid 72 (rather than solenoid 71) moves lever 75 to move trip pin 98 into the gear wheel 41, and further movement of the dispensing wheel 14 causes the gear wheel 41 to move in the opposite direction, thus resulting in upward movement of the associated piston 23 and an incremental decrease of the dispensing chamber 21a.

Figure 12:
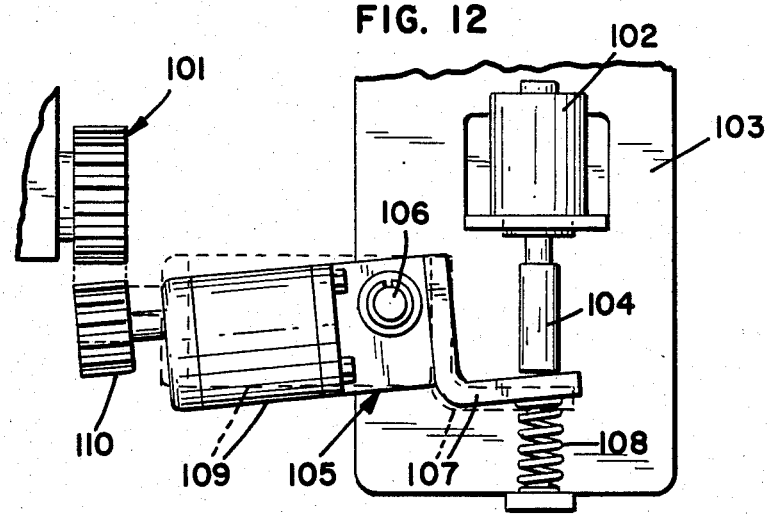
FIG. 12 is a fragmentary view in side elevation of an alternative embodiment of the actuator for the adjustment mechanism.

An alternative approach for adjustment of the dispensing mechanisms 15 is shown in FIG. 12. Here, the gear wheel 41 is replaced by a standard gear 101. A solenoid 102 is mounted to a fixed frame member 103 and includes an adjustable plunger 104. A lever mechanism represented generally by the numeral 105 is pivotally connected to the frame member 103 by a pivot pin 106. The lever mechanism 105 includes an L-shaped member 107 that is disposed in abutting engagement with the plunger 104. A coil spring 108 normally biases the member 107 into such abutting engagement.

Lever mechanism 105 further comprises a reversible stepping motor 109 that is operated by digital pulses for precise operation. Motor 109 carries a gear 110 on its output shaft that is meshable with the gear 101.

With the solenoid 102 in its retracted position as shown in FIG. 12, the lever mechanism 105 is in a nonoperative position as represented by the full lines in the figure. Actuation of the solenoid 102 causes the plunger 104 to extend, moving the lever mechanism 105 to the position represented by phantom lines in the figure, causing engagement of the gear 110 with the gear 101. The motor 109 is thereafter actuated by digital pulses to rotate the gear 110, and hence the gear 101. Motor 109 is reversible, thus permitting an increase or decrease in the volume of the associated dispensing chamber in a desired amount.

Operation of the alternative adjustment mechanism of FIG. 12 must take place during the momentary pause of dispensing wheel 14, since motor 105 actively rotates the gear 101 and does not depend on rotation of the dispensing wheel 14. Operation through the gears 35, 31, 25 to extend and retract the rod 24 and piston 23 is otherwise the same.

In either of the preferred embodiments, the dispensing chambers 21a of any of the dispensing devices 15a–h may be quickly and accurately adjusted to insure that the proper amount of powder is received from the hopper 13 and discharged into the pharmaceutical vial V.

What is claimed is:

1. Apparatus for dispensing metered quantities of a substance to sequentially moving containers, comprising:
   a wheel member revolvable about a predetermined axis of rotation;
   a plurality of substance dispensing devices arranged in a radial manner on the wheel member;
   each dispensing device having a chamber of predetermined volume for retaining a predetermined quantity of the substance, an opening in the chamber through which the substance is received and discharged, and means for varying the chamber volume and hence the quantity of the substance received and discharged;
   and means for adjusting the chamber volume varying means, comprising:
   an externally accessible adjustment member operatively connected to the chamber volume varying means and movable in a first direction to increase the volume of the chamber, and movable in a second direction to decrease the volume of the chamber;
   first and second actuator means selectively engagable with the adjustment member, the first actuator means constructed and arranged to move the adjustment member in said first direction upon engagement therewith, and the second actuator means constructed and arranged to move the adjustment member in said second direction upon engagement therewith.

2. The apparatus defined by claim 1, wherein the means for varying the chamber of volume comprises:
   a piston slidably disposed within the chamber;
   and piston moving means for moving the piston in a first direction to increase the volume of the chamber, and for moving the piston in a second direction to decrease the volume of the chamber;
   the piston moving means being operatively connected to the associated adjustment member.

3. The apparatus defined by claim 2, wherein the piston moving means comprises:
   a threaded rod extending axially within the chamber;
   the piston being mounted to the threaded rod;
   a rotating member having a threaded bore sized to threadably receive the threaded rod, the rotating member being rotatable in a first rotational direction to retract the threaded rod and piston to increase the volume of the chamber, and rotatable in a second rotational direction to extend the threaded rod and piston to decrease the volume of the chamber.

4. The apparatus defined by claim 3, wherein the chamber is cylindrical and has a predetermined axis;
   the piston moves axially in the chamber in said first and second directions;
   the threaded rod is disposed on said axis;
   and the rotating member rotates relative to said axis.

5. The apparatus defined by claim 4, wherein the means for varying the chamber volume further comprises gear means operatively connected between the adjustment member and the rotating member.

6. The apparatus defined by claim 4, wherein:
   the chamber opening is disposed on the periphery of the wheel member;
   the piston is porous;
   and further comprising selectively operable vacuum means operating through the piston to draw the substance into the chamber and pressure means operating through the piston for discharging the substance.

7. The apparatus defined by claim 6, which further comprises hopper means disposed adjacent the wheel member for supplying the substance to the chambers of said substance dispensing devices in a sequential manner, said vacuum means being operable to hold the substance in each chamber until discharge.

8. The apparatus defined by claim 7, which further comprises a substance discharge area remote from the hopper means and through which the containers sequentially move, and the pressure means being operable to discharge and substance from each chamber in the discharge area.

9. The apparatus defined by claim 1, which comprises an externally accessible adjustment member for each chamber; and said first and second actuator means are constructed and arranged for selective engagement with each adjustment member.

10. The apparatus defined by claim 9, wherein each adjustment member is mounted for rotational movement in said first and second directions.

11. The apparatus defined by claim 10, wherein each adjustment member comprises a gear wheel with a plurality of equidistantly spaced teeth projecting radially outward therefrom.

12. The apparatus defined by claim 11, wherein the gear wheels of the respective substance dispensing devices are mounted on and revolve with the wheel member.

13. The apparatus defined by claim 12, wherein the first and second actuator means comprise:
   first and second gear wheel engagement members, respectively, each of said engagement members being movable between engagement and nonengagement positions with said gear wheels, the first and second engagement members being disposed to engage any of said gear wheels on opposite sides of its rotational axis, whereby engagement by one engagement member causes the gear wheel to rotate in one direction, and engagement of the other of said engagement members causes the gear wheel to rotate in the other direction;
   and means for operating each of said engagement members between said engagement and nonengagement positions.

14. The appartus defined by claim 13, wherein each of said engagement members comprises a lever mounted for pivotal movement toward and away from said gear wheels, each lever having a trip pin constructed and arranged to project between the spaced teeth of the gear wheel when the associated lever is moved to the engagement position, whereby revolvement of the wheel member during engagement of one of said trip pins with the gear wheel causes the gear wheel to rotate.

15. The apparatus defined by claim 13, wherein the means for operating the engagement members comprises electrically actuated solenoid means.

16. The apparatus defined by claim 9, wherein:
   the adjustment members are mounted on and revolve with the wheel member; and
   the first and second actuator means are constructed and arranged for selective engagement with each adjustment member during revolvement of the wheel member.

17. Apparatus for dispensing metered quantities of a substance to sequentially moving containers, comprising:
- a wheel member revolvable about a predetermined axis of rotation:
- a plurality of substance dispensing devices arranged in a radial manner on the wheel member;
- each dispensing device having a chamber of predetermined volume for retaining a predetermined quantity of the substance, an opening in the chamber through which the substance is received and discharged, and means for varying the chamber volume and hence the quantity of the substance received and discharged;
- and means for adjusting the chamber volume varying means, comprising:
  - an externally accessible adjustment member operatively connected to the chamber volume varying means and rotatable in a first direction to increase the volume of the chamber, and rotatable in a second direction to decrease the volume of the chamber;
  - a pivotally mounted lever member having one end disposed for movement toward and away from the adjustment member;
  - an engagement wheel rotatably carried by said one end of the lever member and engagable with the adjustment member;
  - reversible motor means for rotating the engagement wheel in either of opposite rotational directions;
  - and actuating means for moving the lever member toward and away from the adjustment member.

18. The apparatus defined by claim 17, wherein the adjustment members and the engagement wheel comprise intermeshably engageable gears.

19. The apparatus defined by claim 18, wherein the actuating means comprises an electrically actuated solenoid.

20. The apparatus defined by claim 17, which comprises an adjustment member for each chamber, each adjustment member being mounted on and revolvable with the wheel member, and the lever member is disposed relative to the wheel member so that the engagement wheel is selectively engagable with each adjustment member as it passes thereby.

21. Apparatus for dispensing metered quantities of a substance to sequentially moving containers, comprising:
- a wheel member revolvable about a predetermined axis of rotation;
- a plurality of substance dispensing devices arranged in a radial manner on the wheel member;
- each dispensing device having a chamber of predetermined volume for retaining a predetermined quantity of the substance, an opening in the chamber through which the substance is received and discharged, and means for varying the chamber volume and hence the quantity of the substance received and discharged;
- and means for adjusting the chamber volume varying means, comprising:
  - an externally accessible adjustment member mounted on the wheel member and revolvable therewith, the adjustment member being operatively connected to the chamber volume varying means and rotatable in a first direction to increase the volume of the chamber, and rotatable in a second direction to decrease the volume of the chamber;
  - and actuator means controllably engagable with the adjustment member as it is revolving on the wheel member to cause it to rotate in either of said two directions to increase or decrease the volume of the chamber.

22. The apparatus defined by claim 21, wherein the adjustment member comprises a gear wheel with a plurality of equidistantly spaced teeth projecting radially outward therefrom, and the actuator means comprises:
- first and second gear wheel engagement members each of which is movable between engagement and nonengagement positions with said gear wheel, the first and second engagement members being disposed to selectively engage said gear wheel on opposite sides of its rotational axis, whereby engagement by one engagement member causes the gear wheel to rotate in one direction, and engagement of the other of said engagement members causes the gear wheel to rotate in the other direction;
- and means for operating each of said engagement members between said engagement and nonengagement positions.

* * * * *